US012655798B2

(12) United States Patent
Lambourne et al.

(10) Patent No.: US 12,655,798 B2
(45) Date of Patent: Jun. 16, 2026

(54) AIRCRAFT FUEL SYSTEM

(71) Applicant: Rolls-Royce plc, London (GB)

(72) Inventors: Alexis Lambourne, Derby (GB); Neil E. Glover, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 19/217,299

(22) Filed: May 23, 2025

(65) Prior Publication Data

US 2025/0377109 A1 Dec. 11, 2025

(30) Foreign Application Priority Data

Jun. 11, 2024 (GB) ...................................... 2408332

(51) Int. Cl.
*F02C 7/224* (2006.01)
*F02C 9/18* (2006.01)
*F23R 3/28* (2006.01)

(52) U.S. Cl.
CPC ................ *F02C 7/224* (2013.01); *F02C 9/18* (2013.01); *F23R 3/286* (2013.01); *F05D 2220/323* (2013.01)

(58) Field of Classification Search
CPC ...... F02C 3/22; F02C 9/40; F02C 7/22; F02C 7/224; F02C 7/185; F23R 3/40
See application file for complete search history.

(56) References Cited

U.S. PATENT DOCUMENTS

2005/0201906 A1* 9/2005 Alvin ........................ F23R 3/40 422/177
2008/0302104 A1* 12/2008 Hwang ..................... F02C 1/08 60/723
2022/0306310 A1* 9/2022 Sibbach .................. F02C 7/224
2023/0045036 A1 2/2023 Czapla et al.
2023/0194097 A1* 6/2023 Hart .......................... F23R 3/40 60/39.12
2024/0133343 A1 4/2024 Palmer et al.
2025/0170543 A1* 5/2025 Sheinberg .................. B01J 8/02

FOREIGN PATENT DOCUMENTS

EP 3978738 A1 4/2022
EP 4488497 A1 * 1/2025 .............. F02C 7/228

OTHER PUBLICATIONS

Great Britain search report dated Oct. 25, 2024, issued in GB Patent Application No. 2408332.1.
European search report dated Oct. 7, 2025, issued in EP Patent Application No. 25175607.8.
Ledjeff, K, Elimination of Hydrogen or Oxygen From Explosive Mixtures By Catalytic Techniques, Ledjeff, K, Elimination of Hydrogen or Oxygen From Explosive Mixtures by Catalytic Techniques, International Journal of Hydrogen Energy, 1987, vol. 12, Issue 5, 361-367.

* cited by examiner

*Primary Examiner* — Gerald L Sung

(57) ABSTRACT

A fuel system for a hydrogen fueled aircraft propulsion system comprises a fuel tank configured to store hydrogen fuel, a main fuel conduit configured to provide fuel to a combustor of a gas turbine engine, a fuel heater comprising a catalytic combustor configured to catalytically combust a portion of the hydrogen fuel prior to delivery to the combustor and a heat exchanger configured to exchange heat between exhaust gases from the fuel heater and hydrogen fuel in the fuel conduit.

14 Claims, 5 Drawing Sheets

AIRCRAFT FUEL SYSTEM

CROSS-REFERENCE TO RELATED APPLICATIONS

This specification is based upon and claims the benefit of priority from United Kingdom patent application number GB 2408332.1 filed on Jun. 11, 2024, the entire contents of which is incorporated herein by reference.

BACKGROUND

Technical Field

This disclosure relates to fuel systems for aero gas turbine engines fueled by hydrogen stored at cryogenic temperatures. The disclosure also relates to aircraft propulsion systems incorporating such fuel systems, and aircraft incorporating such propulsion systems.

Description of the Related Art

In order to limit emissions of carbon dioxide, use of hydrogen as an alternative to hydrocarbon fuel in gas turbine engines has historically only been practical in land-based installations. However, more recently there has been interest in aircraft powered by hydrogen stored at cryogenic temperatures.

Cryogenically stored hydrogen fuel must be increased in temperature prior to delivery to an aircraft engine for combustion, which requires significant expenditure of energy.

Applicant's prior patent application EP 3978738 A1 discloses a means for heating hydrogen prior to delivery to a combustor of a gas turbine engine. A hydrogen fuel vaporiser comprises a fuel offtake configured to divert a portion of hydrogen fuel from a main fuel conduit, a burner configured and arranged to burn the portion of hydrogen fuel diverted from the main fuel conduit, and a heat exchanger configured to transfer heat produced by the burner to hydrogen fuel in the main fuel conduit.

SUMMARY

In a first aspect there is provided a fuel system for a hydrogen fueled aircraft propulsion system, the fuel system comprising:

- a fuel tank configured to store hydrogen fuel;
- a main fuel conduit configured to provide fuel to a combustor of a gas turbine engine;
- a fuel heater comprising a catalytic combustor configured to catalytically combust a portion of the hydrogen fuel prior to delivery to the combustor; and
- a heat exchanger configured to exchange heat between exhaust gases from the fuel heater and hydrogen fuel in the fuel conduit.

The fuel system may comprise a fuel conduit offtake configured to divert a portion of fuel from the main fuel conduit to supply the fuel heater with hydrogen fuel. Alternatively, the fuel system may comprise a fuel tank boil-off vent line which may be configured to supply the fuel heater with hydrogen fuel.

The catalytic combustor may comprise a mesh or an open cell porous structure comprising one or more catalyst materials. The catalyst material may be selected from one or more of the following: $PtO_2$, PdO, Au, $AgO_2$, $RuO_2$, $Co_3O_4$, NiO, CuC, $Fe_2O_3$, MnO or $Cr_2O_3$.

The fuel heater may comprise one or more ignitors configured to initiate catalytic combustion within the catalytic combustor. The one or more ignitors may comprise one of an electrical ignitor and a turbulator.

The catalytic combustor may comprise a first region having a first catalyst material which is different to the remainder of the catalyst material in the remainder of the catalytic combustor. The first catalyst material may comprise a material having a lower catalytic combustion initiation temperature than the material of the remainder of the catalytic combustor.

The fuel system may comprise a controller configured to control a fuel:air ratio within the catalytic combustor. The controller may be configured to control the fuel:air ratio to between a minimum defined by a catalytic combustion extinction limit, and a maximum defined by an air flammability lower limit. The minimum fuel:air ratio may be 0.001, and the maximum fuel:air ratio may be 0.04.

In a second aspect there is a provided a method of heating hydrogen fuel in a fuel system for a hydrogen fueled aircraft propulsion system, the method comprising:

- flowing hydrogen through a fuel conduit;
- flowing hydrogen and oxygen through a catalytic combustor to thereby catalytically combust hydrogen and oxygen;
- exchanging heat between catalytically combusted hydrogen and fuel in the fuel conduit; and
- supplying the heated fuel to a gas turbine engine combustor.

The method may comprise provide fuel and oxygen in a fuel:air ratio between 0.001 and 0.75.

In a third aspect there is provided an aircraft propulsion system comprising a gas turbine engine and a fuel system according to the first aspect.

The propulsion system may comprise a compressor bleed line configured to provide compressor air to the fuel heater.

The compressor bleed line may comprise a bleed valve configured to control compressor bleed air flow to the fuel heater.

In a fourth aspect there is provided an aircraft comprising the propulsion system according to the second aspect.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
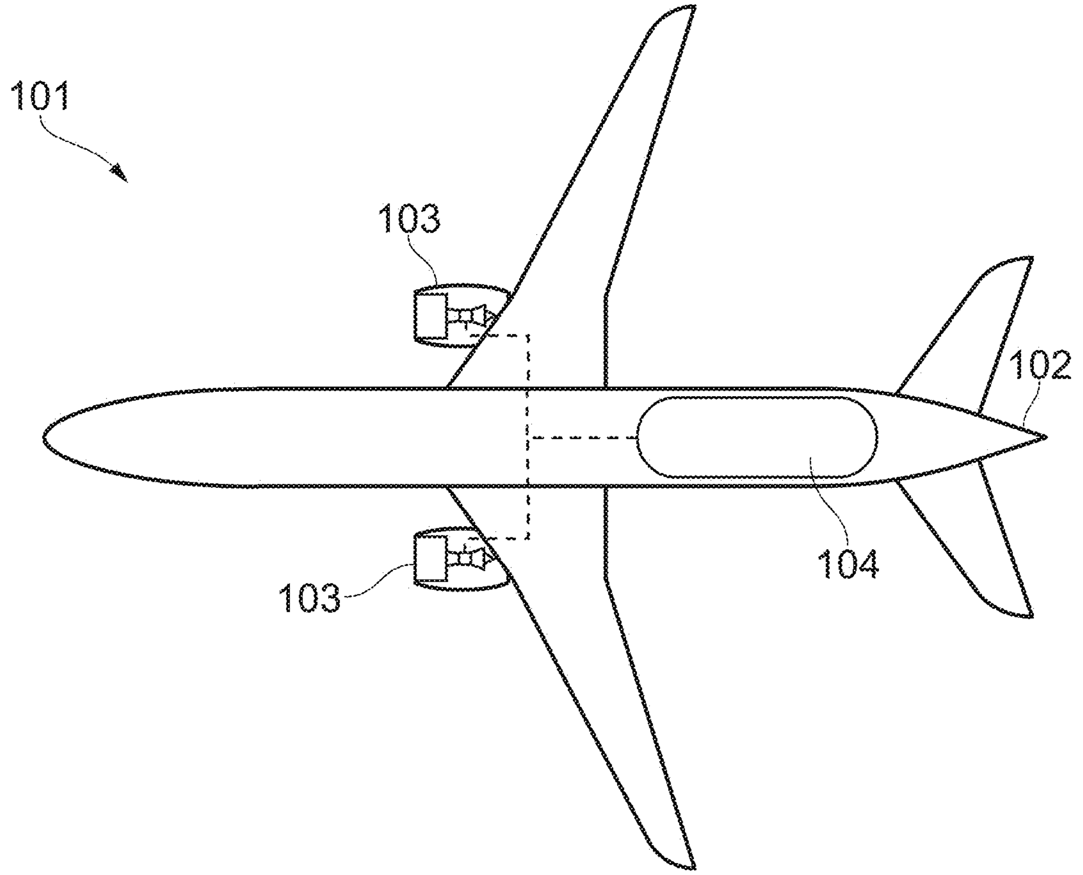
FIG. 1 shows a hydrogen-fueled airliner comprising a propulsion system comprising hydrogen-fueled turbofan engines.

A hydrogen-fueled airliner is illustrated in FIG. 1. In this example, the airliner 101 is of substantially conventional tube-and-wing twinjet configuration with a central fuselage 102 and a propulsion system comprising substantially identical underwing-mounted turbofan engines 103.

A hydrogen storage tank 104 is located in the fuselage 102. The hydrogen storage tank 104 is a cryogenic hydrogen storage tank and thus stores the hydrogen fuel in a liquid state, in a specific example at 22 Kelvin. In this example, the hydrogen fuel is pressurised to a pressure from around 1 bar to around 4 bar, in a specific example 4 bar. As will be appreciated, storing the hydrogen fuel at a higher pressure would necessitate heavier tanks to contain the pressure, and increase the risk of leaks. On the other hand, a lower pressure would reduce the boiling point of the hydrogen, requiring a lower temperature in the tank, and would risk cavitation and or two-phase flow in downstream hydrogen plumbing.

In alternative embodiments, the hydrogen may be stored as a compressed or supercritical fluid at high pressures and low temperatures. For example, the hydrogen may be stored at between 22 and 200 Kelvin, and at pressures between 100 and 300 Bar.

Figure 2:
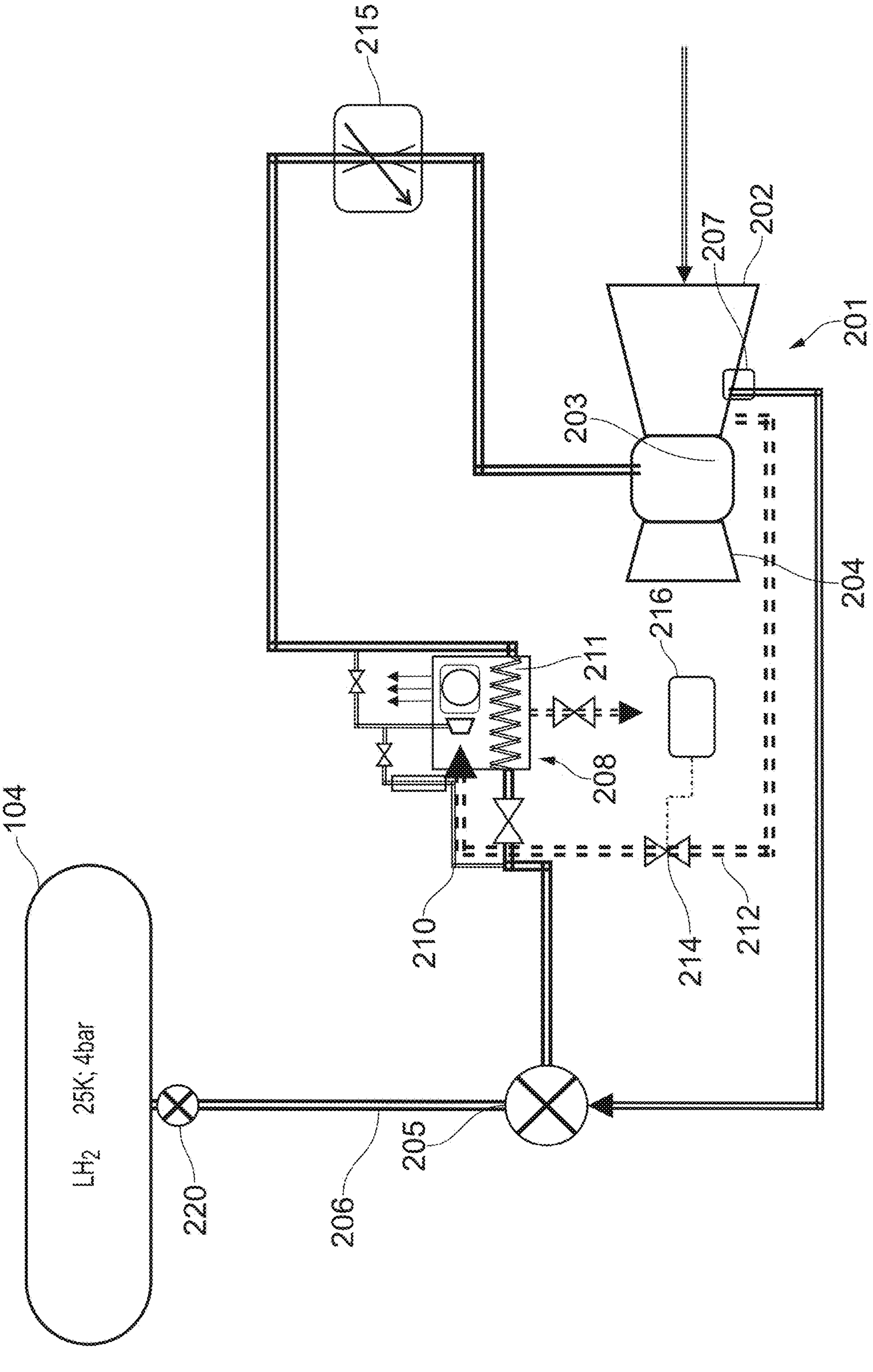
FIG. 2 is a block diagram of a fuel system of the propulsion system of the aircraft of FIG. 1.

A block diagram of one of the propulsion systems comprising one of the engines 103 and its associated fuel system is shown in FIG. 2.

The turbofan engine 103 comprises a core gas turbine 201.

The core gas turbine 201 comprises, in fluid flow series, at least one compressor 202 (and possibly separate low and high-pressure compressors), a core combustor 203 and a turbine system 204 (which typically comprises separate low and high-pressure turbines). The compressor 202 is driven by the turbine 204 via a shaft (not shown), or separate shafts where multiple compressors and turbines are provided. A fan (not shown) is typically provided to provide propulsive thrust in addition to that generated by the engine core. It will be appreciated that in alternative embodiments, the core gas turbine could be of three-shaft configuration, and/or could comprise a reduction gearbox between the turbine and fan.

In operation, hydrogen fuel is pumped from the hydrogen storage tank 104 by one or more pumps 205 and into a main fuel conduit 206 which ultimately delivers fuel to the core combustor 203. In the present embodiment, the pump 205 is driven by an electric machine driven by a main engine provided with electrical power from a main engine driven electrical generator 207. In the present embodiment, the generator 207 is a starter-generator configured to provide both electrical generation and engine starting, but other configurations are envisaged. In other embodiments, the pump 205 may be driven by one or more of the gas turbine engine core shafts via an auxiliary gearbox (not shown). In some cases, a low-pressure pump 220 may also be provided, upstream of the high-pressure pump 205, and may be provided within the liquid hydrogen tank 104. Fuel flow to the engine is controlled by a valve in the form of a Fuel Management Unit (FMU) 215.

Where the tank 104 stores liquid hydrogen, the pump 205 is typically configured to pump liquid hydrogen, rather than primarily to pump gaseous or supercritical hydrogen. Where the tank 104 is configured to store gaseous hydrogen, the pump 205 is configured to pump gaseous hydrogen, or is omitted entirely.

As will be appreciated, it is desirable to increase the temperature of the fuel from the 22 Kelvin cryogenic storage condition to a temperature much closer to the firing temperature of the core gas turbine 201; of course, this is subject to the constraint of not exceeding the autoignition temperature of the hydrogen fuel prior to admission into the combustor 203. In an example, the injection temperature is from 250 to 300 kelvin, for example 250 kelvin. In some cases, it may be desirable to increase the fuel temperature to above an icing temperature, such as 273 Kelvin.

A pre-heater 208 is therefore provided for heating of the hydrogen fuel, and possibly to implement a phase change. In the present embodiment, this takes place between the pump 205 and the core combustor 203. In an embodiment, the heater 208 is configured to raise the temperature of the hydrogen fuel to the required injection temperature.

The heater 208 comprises an offtake 210 configured to divert a portion of the hydrogen fuel from the main fuel conduit 206. A bleed offtake 212 is provided, which provides high-pressure bleed air to the heater. Hydrogen fuel and bleed air are combined within the heater 208 to heat hydrogen in the fuel conduit 206 via a pre-heater heat exchanger 211. A bleed valve 214 is provided to control bleed air flow, as will be described in detail below.

Figure 3:
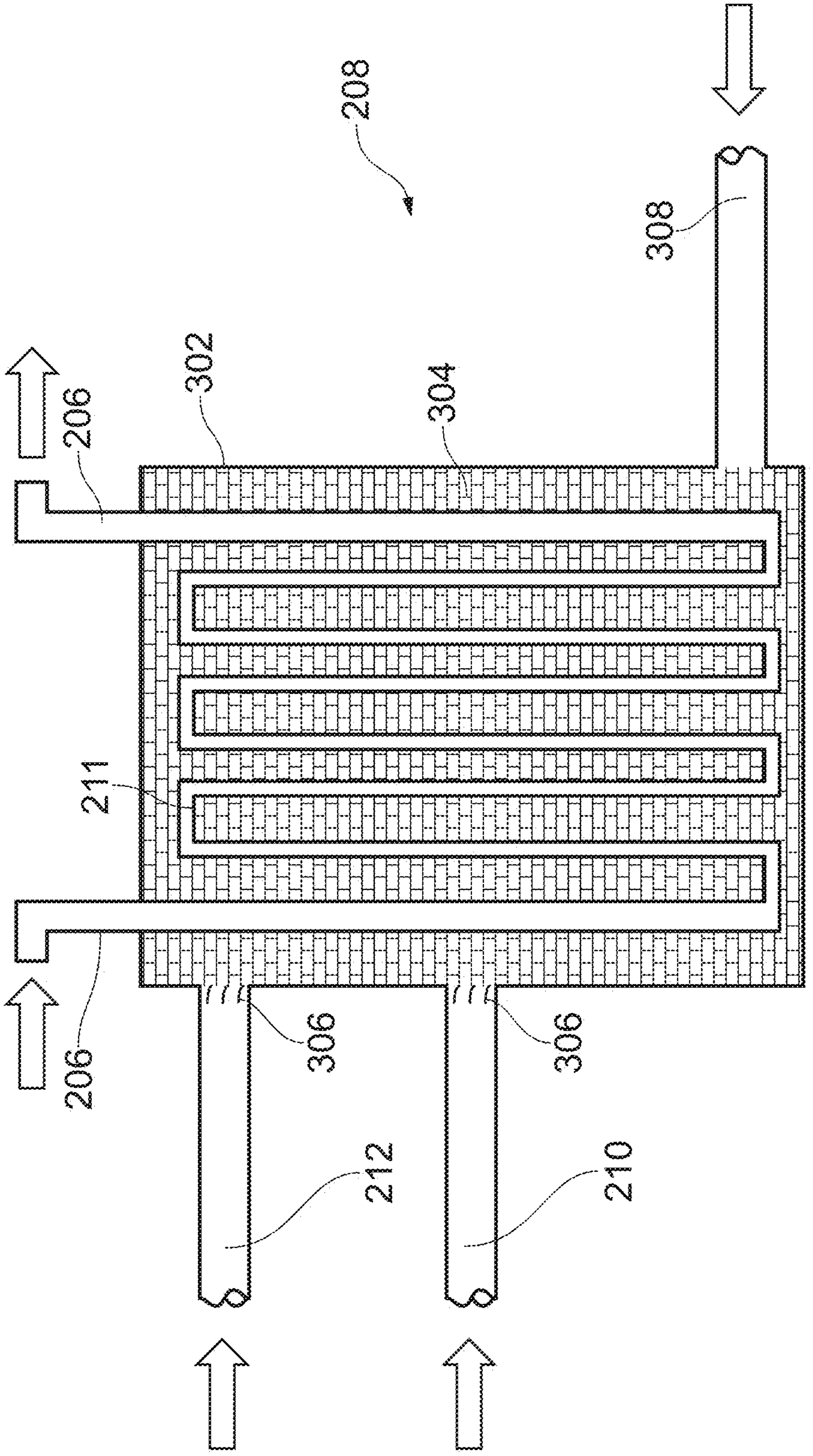
FIG. 3 is a block diagram of a heater of the fuel system of FIG. 2.

Further details of the pre-heater 208 are shown in FIG. 3. The pre-heater comprises a pressure-tight housing 302, which houses a porous matrix 304 comprising a catalyst material. The matrix 304 could take one of several forms, including a metal or ceramic foam coated with the catalyst material to increase surface area. Fuel is introduced to the matrix 304 via the fuel offtake 210 and combined with air from the bleed offtake 212 within the matrix 304. Due to the heat of the bleed air, and shear interaction between the fuel and air flow within the matrix, sufficient energy is provided to initiate catalytic hydrogen combustion within the matrix 304. In some embodiments, turbulators 306 may be provided within the fuel and/or air flows to promote mixing and shear interaction, to ensure ignition of the fuel air mixture. An outlet 308 allows for combustion exhaust to leave the housing 302, to be exhausted overboard, or into the main gas turbine engine turbine flow path. In one example, the combustion exhaust may be utilised as cooling air for the main gas turbine engine combustor and/or turbine. Since the combustion exhaust may be at a low temperature due to heat exchange with the hydrogen fuel, such exhaust may be regarded as "cooled cooling air", and as such a smaller flow of cooling air may be required in order to provide sufficient cooling to high temperature components.

The main fuel conduit 206 passes through the housing 302 into the matrix 304. The main fuel conduit comprises a length of tubing within the matrix 304 to form the heat exchanger 211. The tubing defines a serpentine path to increase the length and therefore surface area in contact with the matrix 304.

One or more of several catalyst materials can be chosen for the matrix 304. Suitable catalysts include platinum group oxides such as platinum dioxide ($PtO_2$), palladium oxide (PdO), ruthenium dioxide ($RuO_2$). Other suitable catalyst materials include gold (Au), silver dioxide ($AgO_2$), cobalt (II, III) oxide ($CO_3O_4$), nickel oxide (NiO), copper carbide (CuC), iron (III) oxide $Fe_2O_3$, manganese dioxide ($MnO_2$) and chromium (III) oxide ($Cr_2O_3$). Other suitable catalysts capable of catalysing the following reaction may also be suitable:

$$2H_2 + O_2 > 2H_2O$$

Figure 4:
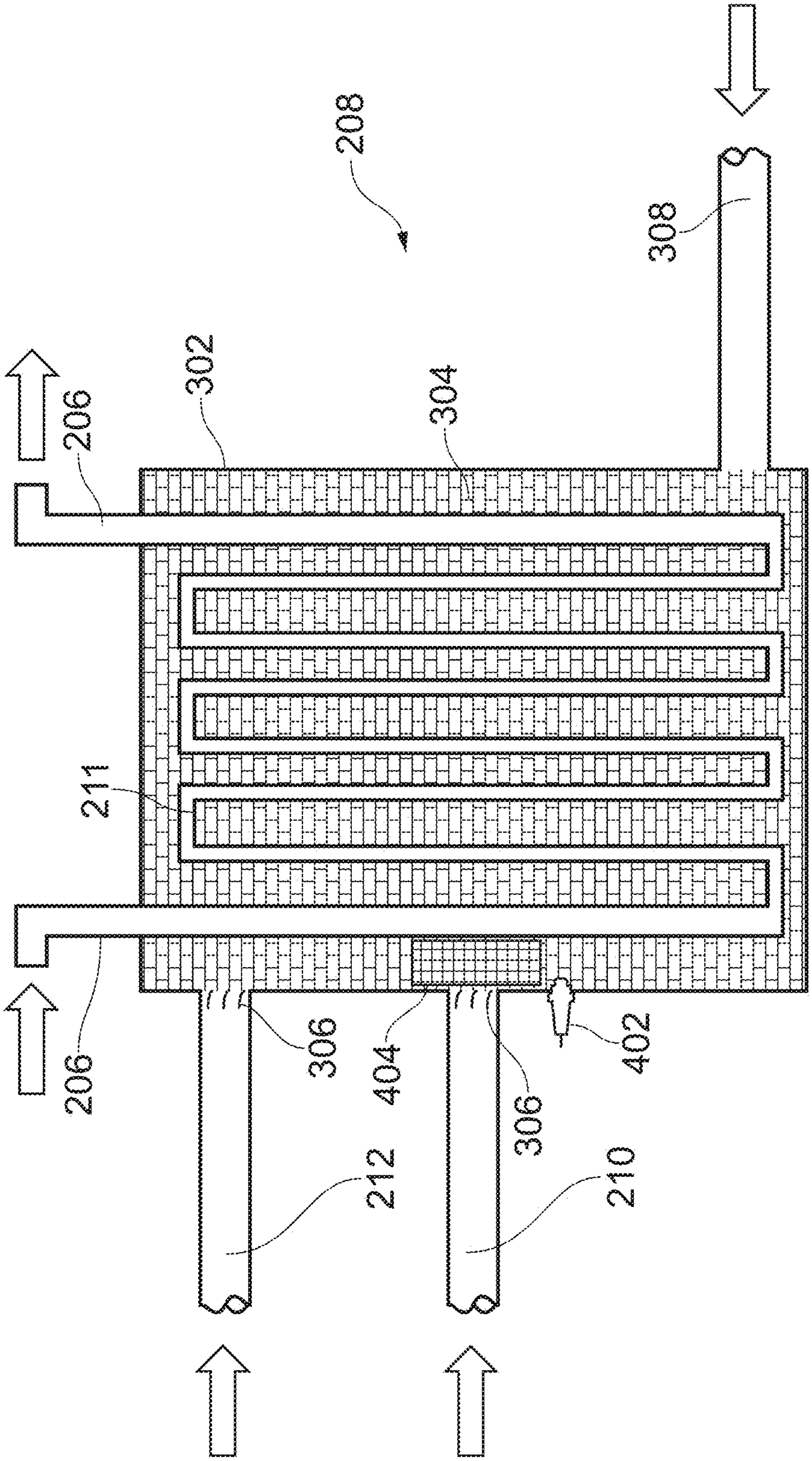
FIG. 4 is a block diagram of an alternative heater for the fuel system of FIG. 2.

FIG. 4 shows a modified pre-heater 208 suitable for use with the fuel system of FIG. 2. In this embodiment, additional means are provided to assist ignition of the fuel-air mixture. In some cases, particularly where the fuel and/or air have a low temperature, or where the mixture is relatively lean (i.e. relatively little fuel is present), conditions within the matrix may be insufficient to trigger catalytic combustion. Accordingly, the catalytic combustor matrix 304 may comprise a first region 404 having a first catalyst material which is different to the catalyst material in the remaining matrix 304. The first catalyst material may comprise a material with a lower catalytic combustion initiation temperature requirement or a leaner fuel requirement in order to ensure catalytic combustion at low temperatures. Suitable catalyst materials include platinum group catalysts such as PdO. The first catalyst material can be selected based on a lowest expected operational temperature. For example, where the lowest expected operational temperature is 0° C., PdO provides an effective catalyst. Catalysts which are effective at temperatures as low as 25° C. include $PtO_2$ and $RuO_2$.

The remaining catalyst in the matrix 304 comprises lower cost catalyst materials such as $Fe_2O_3$, $MnO_2$, $Cr_2O_3$. Since the first catalyst is provided adjacent the fuel outlet 210, catalytic combustion in this region will warm fuel delivered downstream to the remainder of the matrix 304. Accordingly, lower cost catalyst material can be used in these areas.

If even lower operational temperatures are anticipated, additional ignition means may be required, such as an electric ignitor 402. The electric ignitor could comprise a conventional spark plug, which could ensure ignition even under extreme low temperatures and lean air-fuel mixtures.

During use therefore, fuel is flowed to the pre-heater 208 before being combined with oxygen and catalytically combusted. The combustion gases heat the remaining fuel via a heat exchanger. In order to control heating output of the preheater 208, the bleed valve 214 is controlled to control bleed air flow. In some embodiments, a fuel valve (not shown) may be provided to control hydrogen fuel flow through the heater 208. However, in other embodiments, the hydrogen fuel valve may be omitted. Accordingly, heat output can be controlled by controlling only airflow.

In use, a fuel-air mixture compatible with catalytic combustion must be maintained. Depending on the catalyst material and the pressure and temperature conditions within the matrix 304, this air-fuel mixture may be relatively lean. For example, a fuel:air ratio as low as 0.001 can be tolerated, while maintaining combustion within the matrix. In some embodiments, the system may be configured to maintain a fuel:air ratio below a lean air flammability lower extinction limit, such as a fuel:air ratio of 0.04 within the matrix. Accordingly, fire risk is reduced, as the hydrogen fuel within the matrix is insufficient to support conventional combustion. Accordingly, a controller 216 is provided to control the valve 214 to control fuel:air mixture to within these limits.

Several advantages are envisaged of the current system compared to one in which the fuel is heated by a pre-heater comprising a conventional combustor, such as the one disclosed in EP 3978738 A1.

During use, a very wide range of fuel flow rates may be required by the combustor of the gas turbine engine 201. For example, at maximum take-off power at sea level, fuel flow rates may be several times greater than when the engine is operated at idle at high altitudes. Similarly, temperature of fuel entering the pre-heater may also vary, particularly where other heating sources such as recuperators and oil coolers are used. Accordingly, the pre-heater must be sized for the highest anticipated heating requirement, but must also be capable of reliable operation at much lower heating requirements.

In a conventional combustor, fuel-air ratio must be kept within a relatively narrow band to ensure efficient combustion. Accordingly, both air and fuel flow may need to be controlled by respective valves. However, controlling flow of hydrogen fuel, particularly at low temperatures, is difficult. The use of a catalytic combustor can allow for combustion at very high or very low fuel:air ratios, which permits for control of the system using only a single valve (either a fuel valve or an air valve). This can also reduce bleed air flow requirements, which increases the overall system efficiency, as less high-pressure air is bled from the core.

Furthermore, the reliability of the system is increased. Small combustors are prone to flame-out, particularly when operated at low-pressure or low fuel-flow rates. A flameout may result in loss of fuel heating, and may also result in the release of unburnt hydrogen in the heater exhaust, which represents a fire risk. On the other hand, catalytic combustion is highly reliable at these conditions, and may not require active means such as an ignitor to initiate. Accordingly, the system is safer in operation.

Figure 5:
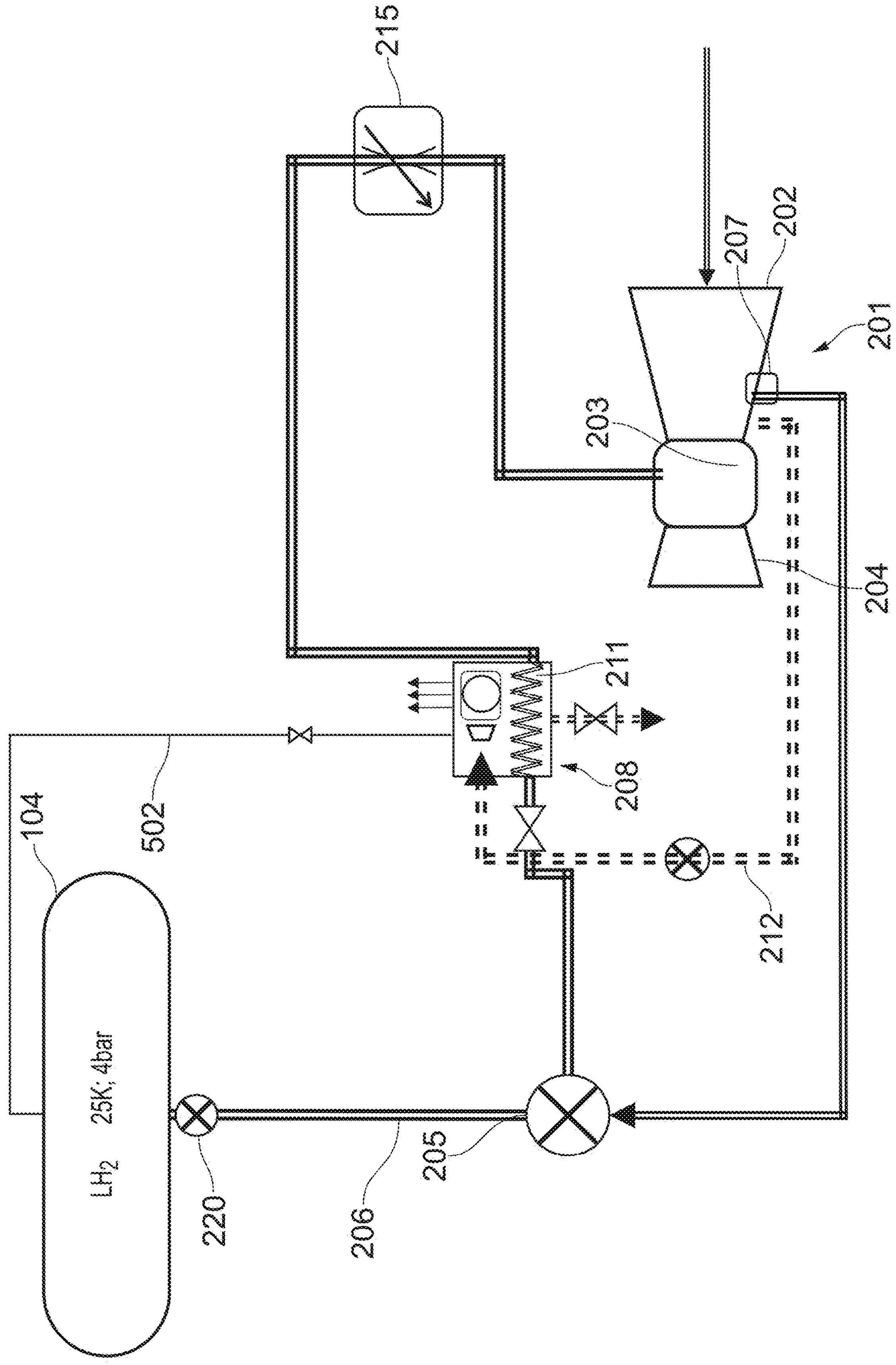
FIG. 5 is a block diagram of an alternative fuel system for the propulsion system of the aircraft of FIG. 1.

FIG. 5 shows an alternative fuel system. The fuel system is similar to the system of FIG. 2, but the hydrogen fuel for the preheater is supplied directly from the tank 104 via a dedicated offtake comprising a boil-off vent line 502 in place of the main fuel conduit offtake. In this embodiment, the vent line 502 is positioned to tap off boil-off gases from the tank 104 to supply the heater 208. Accordingly, gases that would otherwise be wasted from the system are used for heating the main hydrogen fuel supply. This fuel may also be warmer, thereby reducing or eliminating the need for additional heating means to heat fuel provided to the pre-heater 208.

Various examples have been described, each of which comprise one or more combinations of features. It will be appreciated by those skilled in the art that, except where clearly mutually exclusive, any of the features may be employed separately or in combination with any other features and the invention extends to and includes all combinations and sub-combinations of one or more features described herein.

Various modifications to the embodiments above described could be made. For instance, the heater may be configured to indirectly exchange heat between the catalytic combustion exhaust gases and the hydrogen fuel. For instance, an intermediate heat exchange fluid such as helium could be employed, with additional heat exchangers, in order to minimise the risk of the main hydrogen fuel supply leaking into the catalytic combustor.

The invention claimed is:

1. A fuel system for a hydrogen fueled aircraft propulsion system, the fuel system comprising:

a fuel tank configured to store hydrogen fuel;

a main fuel conduit configured to provide the hydrogen fuel to a combustor of a gas turbine engine;

a fuel heater comprising a catalytic combustor configured to catalytically combust a portion of the hydrogen fuel prior to delivery to the combustor; and a heat exchanger configured to exchange heat between exhaust gases from the fuel heater and the hydrogen fuel in the fuel conduit;

a controller configured to control a fuel:air ratio within the catalytic combustor;

wherein the controller is configured to control the fuel:air ratio to between a minimum defined by a catalytic combustion lean extinction limit, and a maximum defined by an air flammability lower limit.

2. The fuel system according to claim 1, wherein the fuel system comprises a fuel conduit offtake configured to divert a portion of the hydrogen fuel from the main fuel conduit to supply the fuel heater with hydrogen fuel.

3. The fuel system according to claim 1, wherein the fuel system comprise a fuel tank boil-off vent line configured to supply the fuel heater with hydrogen fuel.

4. The fuel system according to claim 1, wherein the catalytic combustor comprises a mesh or an open cell porous structure comprising one or more catalyst materials.

5. The fuel system according to claim 4, wherein the one or more catalyst materials are selected from one or more of the following: $PtO_2$, PdO, Au, $AgO_2$, $RuO_2$, $Co_3O_4$, NiO, CuC, $Fe_2O_3$, MnO or $Cr_2O_3$.

6. The fuel system according to claim 1, wherein the fuel heater comprises one or more ignitors configured to initiate catalytic combustion within the catalytic combustor.

7. The fuel system according to claim 6, wherein the one or more ignitors comprise one of an electrical ignitor and a turbulator.

8. The fuel system according to claim 1, wherein the catalytic combustor comprises a first region having a first catalyst material which is different to the remainder of the catalyst material in the remainder of the catalytic combustor, and wherein the first catalyst material comprises a material having a lower catalytic combustion initiation temperature than the material of the remainder of the catalytic combustor.

9. The fuel system according to claim 1, wherein the minimum fuel:air ratio is 0.001 and the maximum fuel:air ratio is 0.04.

10. A method of heating hydrogen fuel in a fuel system for a hydrogen fueled aircraft propulsion system, the fuel system comprising a fuel tank configured to store hydrogen fuel; a main fuel conduit configured to provide the hydrogen fuel to a combustor of a gas turbine engine; a fuel heater comprising a catalytic combustor configured to catalytically combust a portion of the hydrogen fuel prior to delivery to the combustor; and a heat exchanger configured to exchange heat between exhaust gases from the fuel heater and the hydrogen fuel in the fuel conduit; a controller configured to control a fuel:air ratio within the catalytic combustor; wherein the controller is configured to control the fuel:air ratio to between a minimum defined by a catalytic combustion lean extinction limit, and a maximum define by an air flammability lower limit, the method comprising: flowing the hydrogen fuel through the fuel conduit; flowing the hydrogen fuel and oxygen through the catalytic combustor to thereby catalytically combust the hydrogen fuel and the oxygen; controlling the fuel:air ratio in the catalytic combustor to between the minimum and the maximum; exchanging heat between the exhaust gases and the hydrogen fuel in the fuel conduit; and supplying the heated hydrogen fuel to the combustor.

11. The method according to claim 10, wherein the method comprises providing fuel and oxygen in a fuel:air ratio between 0.001 and 0.04.

12. An aircraft propulsion system comprising a gas turbine engine and the fuel system according to claim 1.

13. The aircraft propulsion system according to claim 12, wherein the aircraft propulsion system comprises a compressor bleed line configured to provide compressor air to the fuel heater.

14. The aircraft propulsion system according to claim 13, wherein the compressor bleed line comprises a bleed valve configured to control compressor bleed air flow to the fuel heater.

* * * * *